(No Model.) 9 Sheets—Sheet 1.

A. B. HAYDEN.
COMBINED CASH REGISTER AND PHONOGRAPH.

No. 460,492. Patented Sept. 29, 1891.

Witnesses:
R. A. Balderson
Alfred Toll

Inventor:
Austin B. Hayden
By: Phil. T. Dodge
his Atty.

(No Model.) 9 Sheets—Sheet 2.
A. B. HAYDEN.
COMBINED CASH REGISTER AND PHONOGRAPH.
No. 460,492. Patented Sept. 29, 1891.
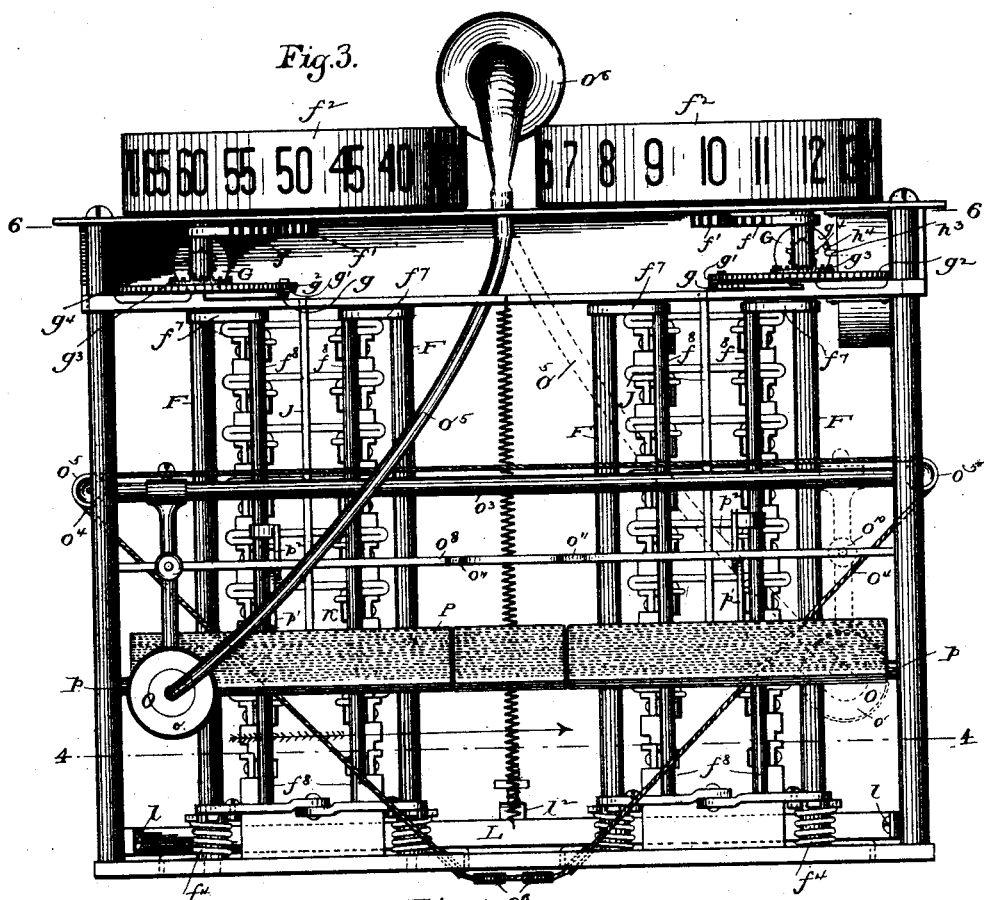
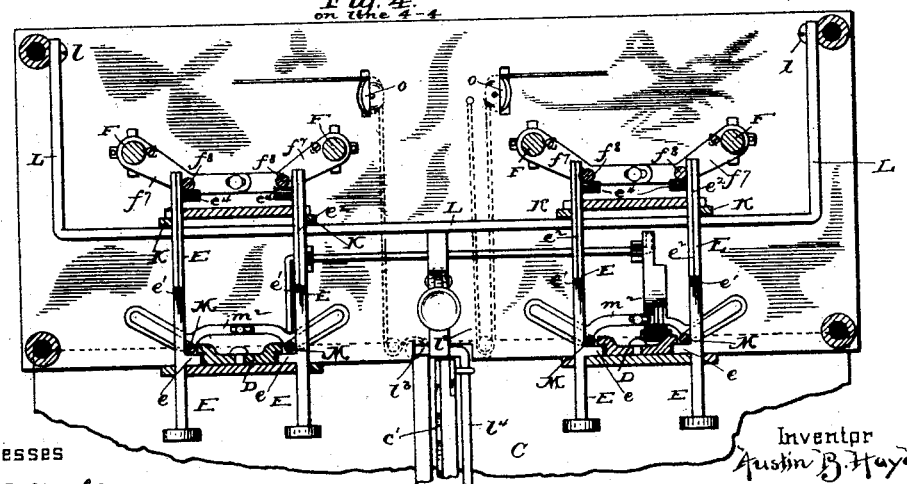
Witnesses
R. A. Balderson,
Alfred Toll.
Inventor
Austin B. Hayden
By Phil T. Dodge
his Atty.

(No Model.)
9 Sheets—Sheet 3.

A. B. HAYDEN.
COMBINED CASH REGISTER AND PHONOGRAPH.

No. 460,492.          Patented Sept. 29, 1891.

on line 6-6

Witnesses:
R. A. Balderson
Alfred Toll

Inventor:
Austin B. Hayden
By: Phil T. Dodge
his Atty.

(No Model.)  9 Sheets—Sheet 4.

A. B. HAYDEN.
COMBINED CASH REGISTER AND PHONOGRAPH.

No. 460,492.  Patented Sept. 29, 1891.

Witnesses:
R. A. Balderson
Alfred Toll

Inventor
Austin B. Hayden
By Phil T. Dodge
his Atty.

(No Model.) 9 Sheets—Sheet 5.
A. B. HAYDEN.
COMBINED CASH REGISTER AND PHONOGRAPH.
No. 460,492. Patented Sept. 29, 1891.
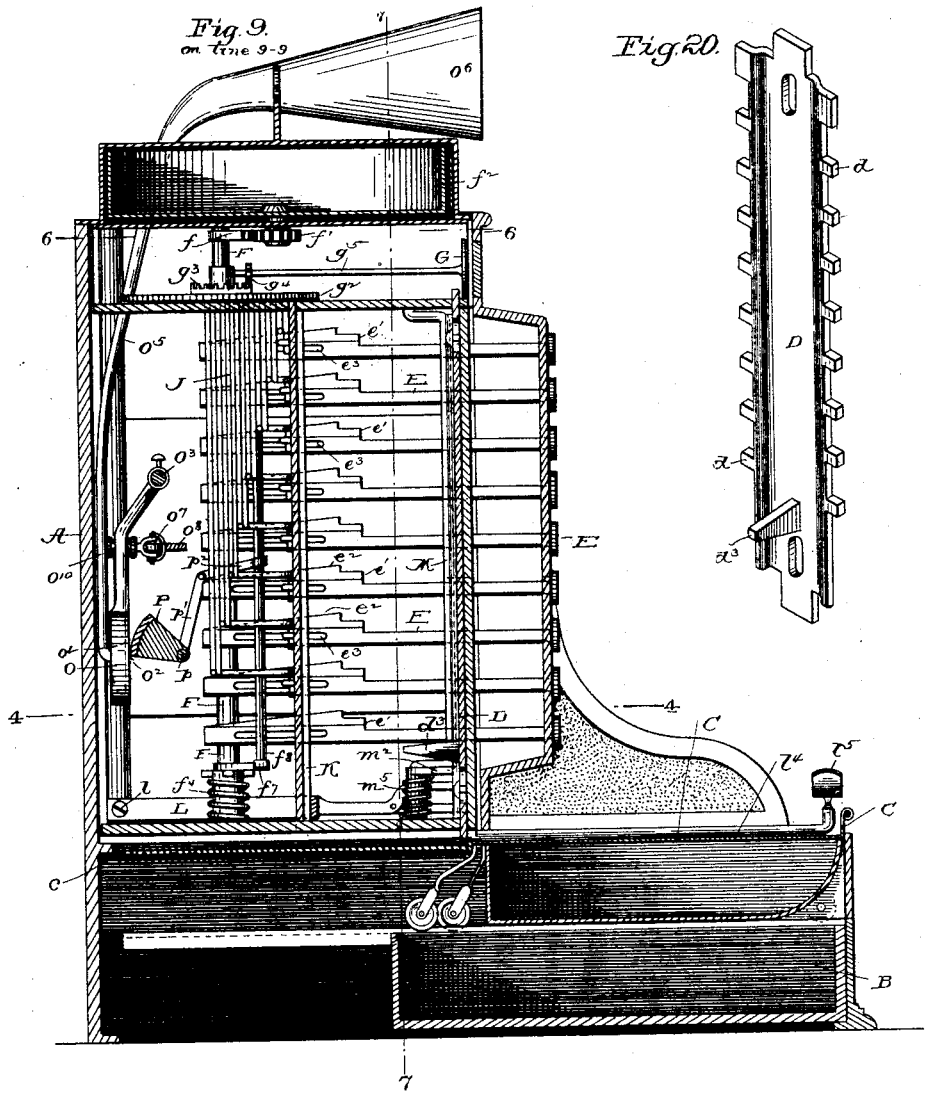
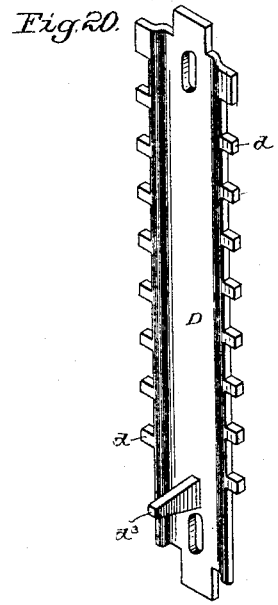
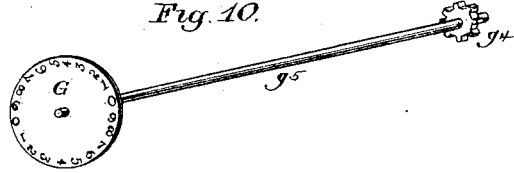
Witnesses
R. A. Balderson
Alfred Toll
Inventor
Austin B. Hayden
By Phil T. Dodge
his Atty.

(No Model.) 9 Sheets—Sheet 6.
A. B. HAYDEN.
COMBINED CASH REGISTER AND PHONOGRAPH.
No. 460,492. Patented Sept. 29, 1891.
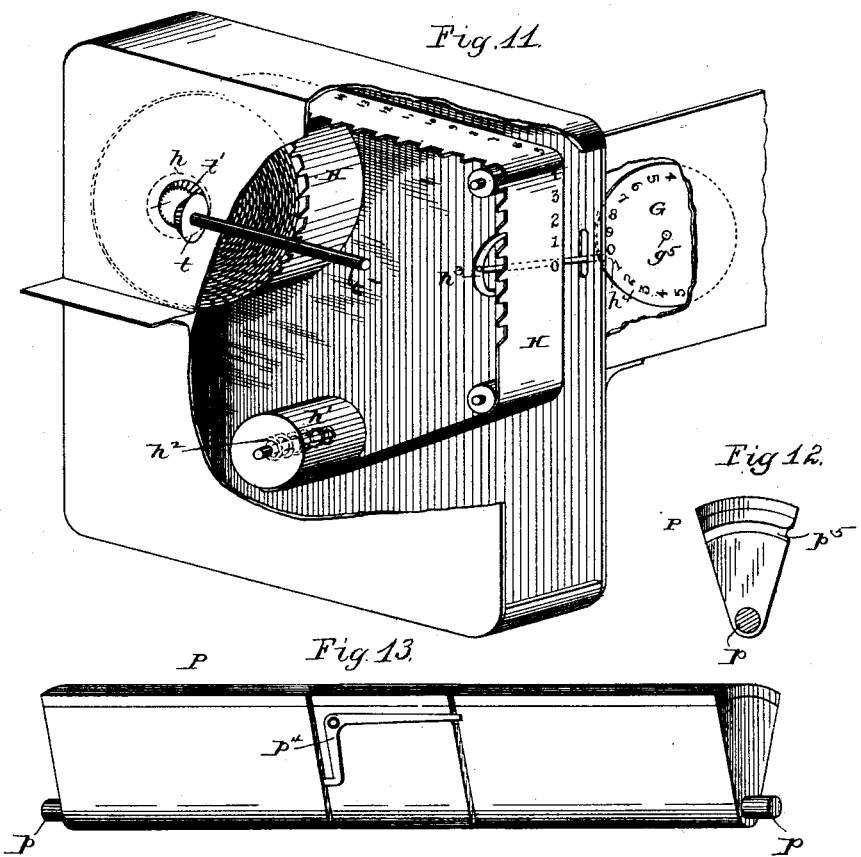
Witnesses
R. A. Balderson
Alfred Toll
Inventor
Austin B Hayden.
By Phil. T. Dodge
his Atty (No Model.) 9 Sheets—Sheet 7.
A. B. HAYDEN.
COMBINED CASH REGISTER AND PHONOGRAPH.

No. 460,492. Patented Sept. 29, 1891.

(No Model.) 9 Sheets—Sheet 8.
A. B. HAYDEN.
COMBINED CASH REGISTER AND PHONOGRAPH.

No. 460,492. Patented Sept. 29, 1891.

Witnesses:
R. A. Balderson
Alfred Toll

Inventor:
Austin B. Hayden
By: Phil T. Dodge
his Atty.

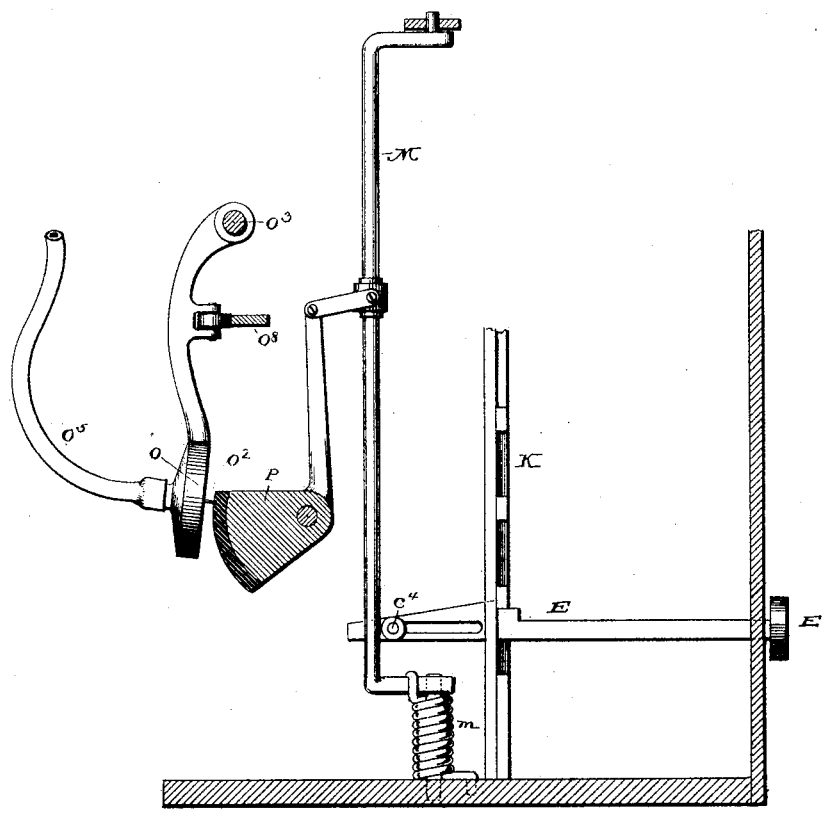

UNITED STATES PATENT OFFICE.

AUSTIN B. HAYDEN, OF KANSAS CITY, MISSOURI, ASSIGNOR TO THE HAYDEN ARTICULATING CASH REGISTER COMPANY, OF MISSOURI.

COMBINED CASH-REGISTER AND PHONOGRAPH.

SPECIFICATION forming part of Letters Patent No. 460,492, dated September 29, 1891.

Application filed August 20, 1890. Renewed September 11, 1891. Serial No. 405,359. (No model.)

*To all whom it may concern:*

Be it known that I, AUSTIN B. HAYDEN, of Kansas City, in the county of Jackson and State of Missouri, have invented certain Improvements in Cash-Registers, of which the following is a specification.

My invention consists, broadly, first, in the combination, with a cash-registering mechanism, of a phonograph or equivalent instrument to announce audibly the amounts registered; second, in a peculiar construction and arrangement of the parts to this end, and, third, in various details of construction pertaining to the register.

Figure 1:
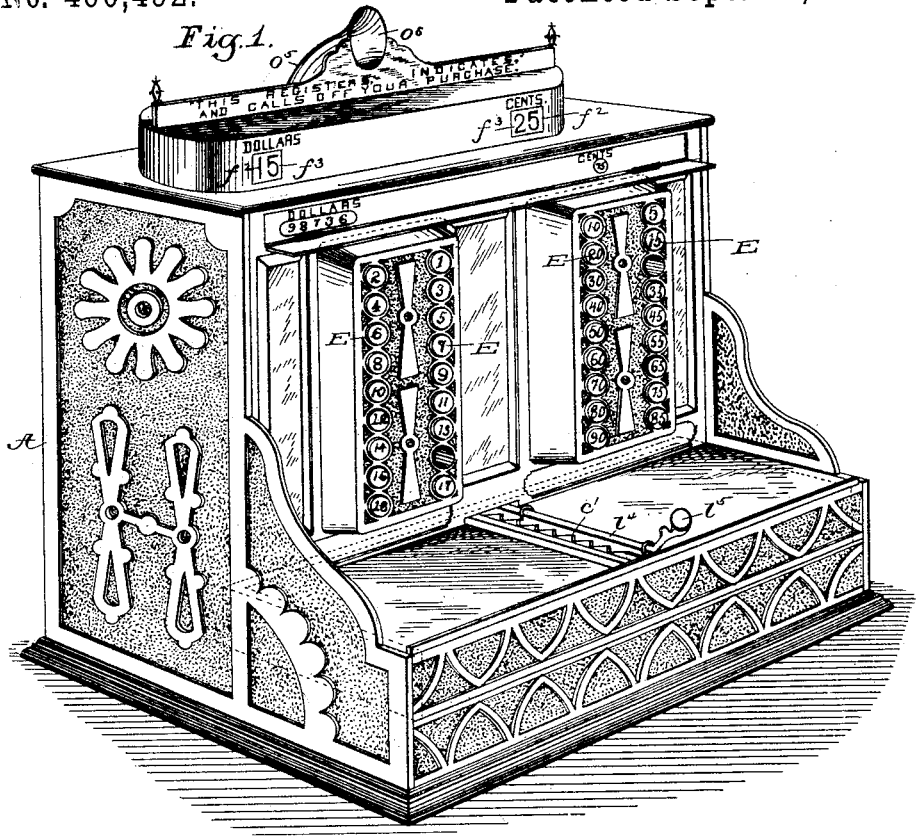
Figure 2:
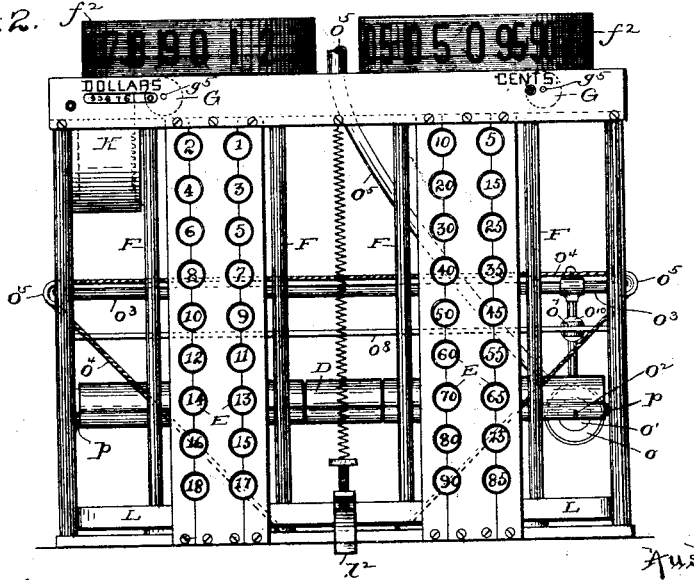
Figure 5:
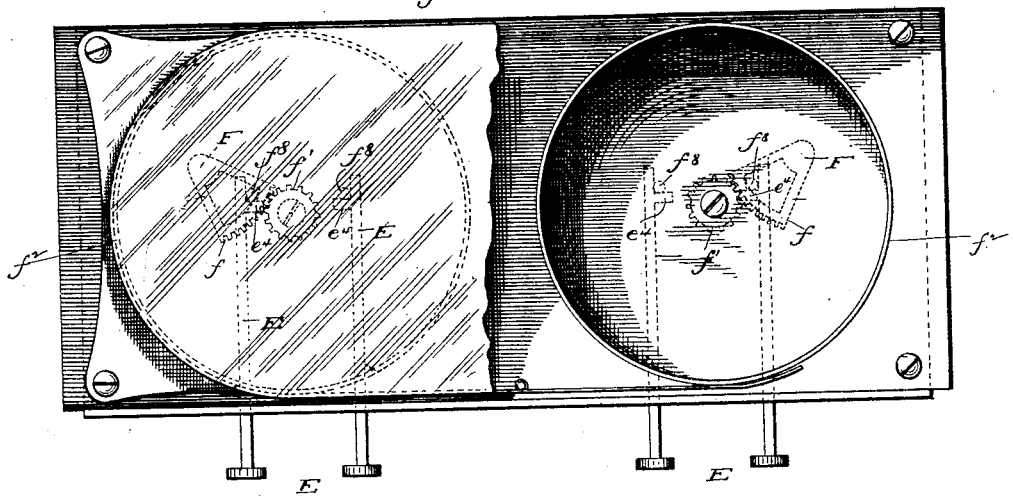
Figure 6:
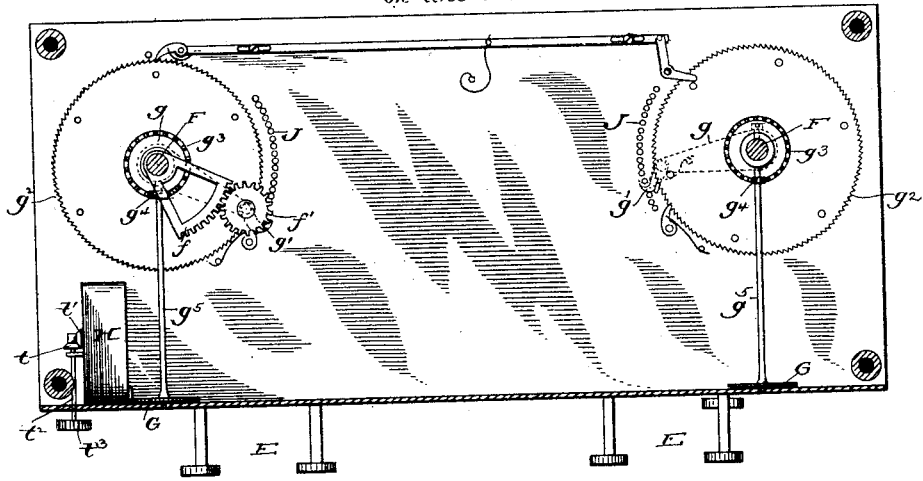
Figures 7, 8:
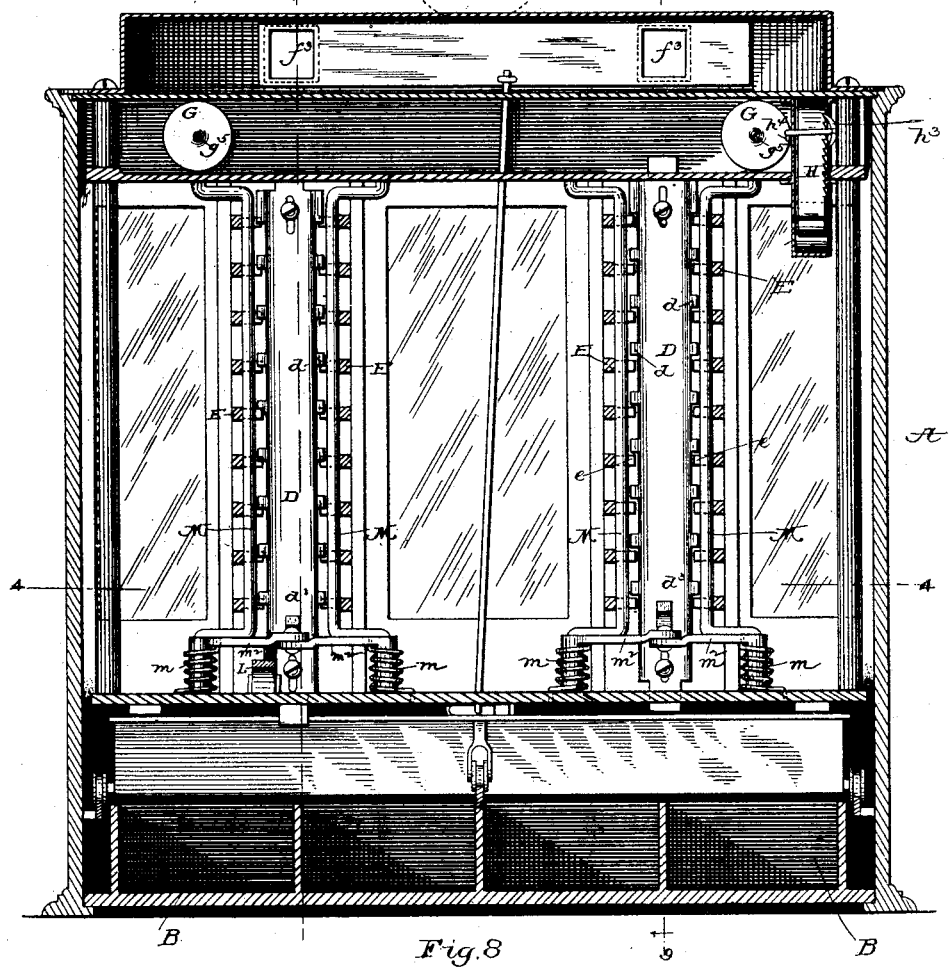
Figure 14:
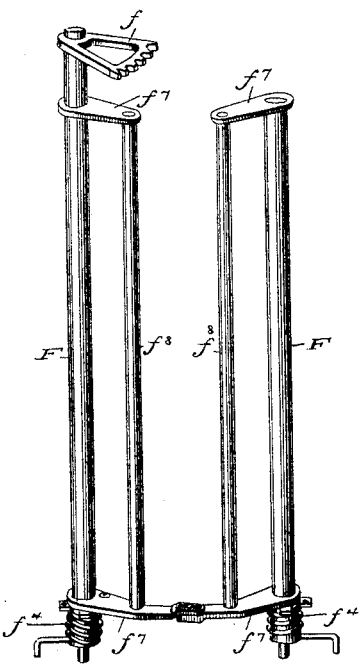
Figure 16:
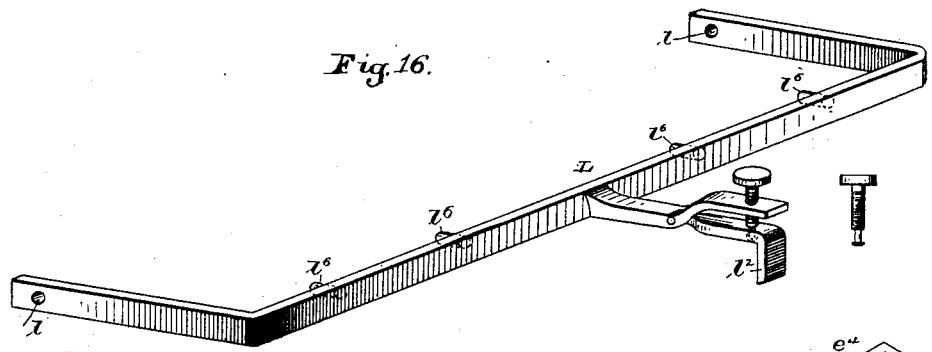
Figure 17:
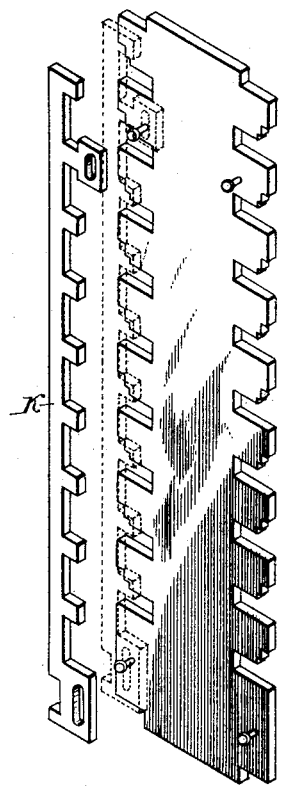

In the accompanying drawings, Figure 1 is a perspective view of my register. Fig. 2 is a front elevation of the principal parts of the registering mechanism with the casing removed. Fig. 3 is a rear elevation of the same on a larger scale. Fig. 4 is a horizontal section on the line 4 4 of Figs. 3, 7, and 9. Fig. 5 is a top plan view of the indicating mechanism with a portion broken away. Fig. 6 is a horizontal section on the line 6 6 of Figs. 3 and 9. Fig. 7 is a vertical section through the apparatus from side to side on the line 7 7 of Fig. 9. Fig. 8 is a cross-section through one of the indicating-wheels. Fig. 9 is a cross-section from front to rear on the line 9 9 of Fig. 7. Fig. 10 is a portion of the registering mechanism. Fig. 11 is a perspective view showing the registering-band to be used for unusually-large amounts. Figs. 12 and 13 are respectively an end view and a perspective view of the phonographic-record body. Fig. 14 is a perspective view showing two of the rock-shafts upon which the finger-keys act and through which the indicating and registering devices are operated. Fig. 15 is a vertical cross-section showing the device to retard the closing movement of the till-cover. Figs. 16 to 20 are views of details hereinafter explained. Fig. 21 is a sectional elevation illustrating the details of the phonograph devices.

Referring to the drawings, A represents a casing containing in its top an indicating and a registering mechanism and having at the base a forwardly-extended portion containing one or more tills or cash-drawers B, and a horizontally-sliding cover C to close the same. The till is opened by sliding the cover rearward, and when released the cover is automatically closed by a spring $c$, which may be applied in any suitable manner. When closed, the cover is automatically locked by two upright gravitating bars B, (shown in Figs. 7, 9, and 20,) which fall behind its edge. On its top the cover is provided with a series of ratchet-teeth $c'$, Figs. 1 and 19, and when open it is automatically locked open by the engagement of these teeth with a finger $l^2$ on the front of a U-shaped gravitating bail or bar L, mounted in pivots $l$, as shown in Figs. 2, 3, 4, 9, 16, and 19. The bail to lock the cover open and the bars to lock it shut are controlled by the registering mechanism, as hereinafter explained.

Figure 18:
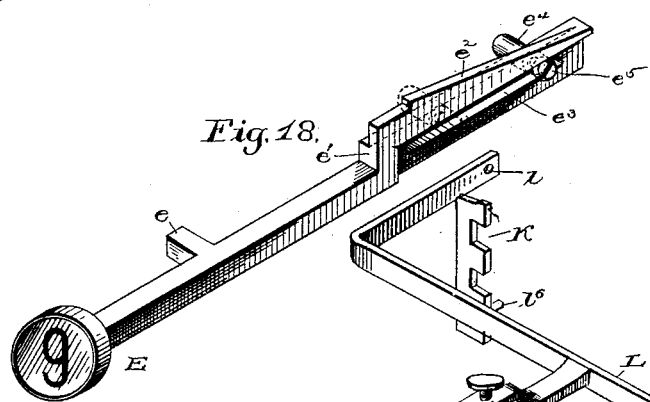
Figure 19:
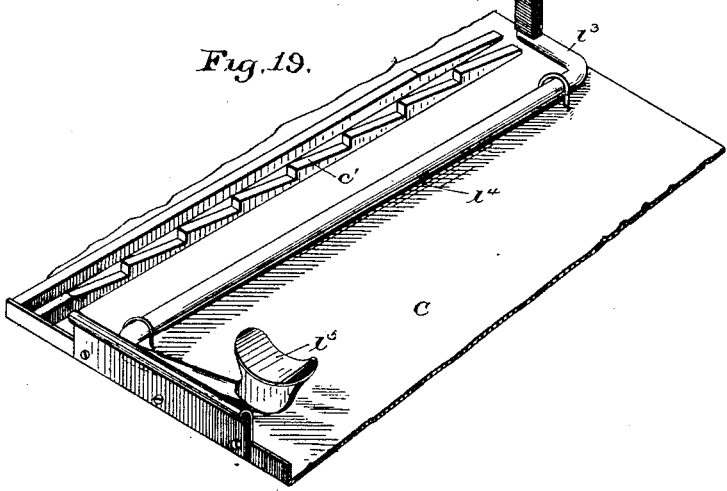

E E are finger-keys in four vertical rows or tiers, guided to slide forward and backward in the frame independently, and each representing a distinctive amount. In the present instance the two rows on the left represent dollars and those on the right cents, in amounts regularly increasing by five. Each key has, as shown in Fig. 18, a lateral shoulder $e$, a vertical shoulder $e'$, and an inclined surface $e^2$ at the inner end. It is further provided with a longitudinal slot $e^3$, containing a laterally-projecting stud $e^4$, held by a screw $e^5$, so that it may be adjusted lengthwise of the key and fixed rigidly in position. This stud may be formed rigidly on the key; but the construction shown admits of the keys being cheaply manufactured in duplicate and of their respective studs being fixed in different positions, as required.

In Figs. 2, 3, 4, and 21, F F are vertical rock-shafts, mounted one adjacent to each tier of keys and each having, as shown in Fig. 21, two crank-arms $f^7$, carrying at their outer ends a vertical rod $f^8$, lying behind the key-studs $e^4$, so that the shaft forms in effect a crank with a long wrist, against which the studs $e^4$ act, so that whenever a key is pushed inward it imparts to the shaft F a partial rotation, the extent of which depends on the location of the stud on the key. The keys in each tier have their studs at different points in their length, so that they turn the shaft and the registering devices different distances, according to the amount represented by the respective keys. Each of the shafts F carries at the top a sector-pinion $f$, engaging a pinion $f'$ on a horizontal drum $f^2$, the periphery of which bears in regular succession the amounts represented by the indicating-keys, so that when a key is pressed the drum will be turned to expose the appropriate amount through an opening $f^3$ on the front of the casing. The keys and drum are returned to their normal positions when released by a spiral spring $f^4$, applied to the shaft F, urging the same forward. The drum answers merely as a temporary indicator for the last registration.

To give a permanent indication of the aggregate amount registered, the rock-shaft F is provided at the top with an arm $g$, carrying a pawl $g'$, which engages a horizontal ratchet-wheel $g^2$, carrying a pinion $g^3$, which in turn drives pinion $g^4$ on shaft $g^5$, which carries at the front of the case a wheel G, marked with amounts representing dollars which are exposed successively through an opening in the casing. This wheel G is advanced by the ratchet mechanism step by step.

For registering still larger amounts I provide, as shown in Fig. 11, a long metal band or ribbon H, having numbers thereon in regular order, and wind the same upon a drum $h$, attaching its outer end to a second drum $h'$, containing a coiled spring $h^2$, which tends to wind the band thereon. The band is toothed in one edge and is engaged by an escapement-lever $h^3$, acted on by a stud $h^4$ on wheel G, so that each time the wheel completes a rotation it operates the escapement and permits the band to advance one tooth in order to expose its next higher number.

In order that the drums and the registering mechanism may not be carried beyond the proper points by their momentum when quickly operated, I mount on the inclined surface $e^2$ of each finger-key, as shown in Figs. 9 and 6, a vertically-guided stop-wire J, which is lifted by the inward movement of the key out of the path of the arm $g$ on the vertical shaft, so as to limit the motion of the arm, and thereby the movement of the drum and their registering devices. The respective pins are so located as to stop the parts in different positions, so that each indication will correspond with the value of the key by which it is effected.

It is desirable that each key shall be temporarily locked in when it is operated to effect the indication. This is accomplished by mounting adjacent to each tier of keys a vertically-sliding bar K, (see Figs. 4, 9, and 17,) having teeth to ride on the inclined ends of the key, so that when a key is pushed in until its shoulder $e'$ passes the bar K the latter will fall behind the shoulder and thus hold the key, and keep the drum in position to expose the indication. The locking-bars K are raised to release the keys by the horizontal bail or bar L, before referred to, the bail, which rises and falls, being provided on its front with studs $l^6$, which enter vertical slots in the bars K, so that the latter are permitted a limited independent motion. It will be remembered that this bail serves also to hold the till-cover open. Its elevation to release the finger-keys is effected by a rock-shaft $l^4$, (see Figs. 9 and 19,) mounted on the till-cover, and having at one end a crank-arm $l^3$, and at the opposite end a finger-piece $l^5$, so that when the finger-piece is depressed the bail L and the bars K will be lifted and the keys and the indicating devices restored to their normal positions.

When any one key in either the dollar or the cent column is pushed inward, it is desirable to prevent the operation of any other key in the same series. This result is secured by the gravitating-bars D, which lock the till-cover, as before explained. Each bar is made, as in Fig. 20, with side teeth $d$, so that when the bar falls behind the till-cover the teeth fall behind the studs $e$ of those teeth which are in their normal positions, as shown in Fig. 7. The lifting of the bars D to unlock the till-cover and the keys is effected by vertical shafts M, one for each tier of keys. These shafts, which have cranked ends, lie behind the studs $e$ of the keys, and are provided with coiled springs $m$, which tend to turn them forward. At the lower ends the shafts have their crank-arms $m^2$ arranged to turn forward beneath inclined lugs $d^3$ on the locking-bars D, which are lifted thereby. A single locking-bar D is used between the two tiers of dollar-keys, and in like manner a single bar is used between the tiers of cent-keys, and this to prevent the operation of two keys of the same denomination. The crank-arms $m^2$ of each pair of shafts are connected that they may work in unison.

The operation is as follows: Assume that a sale has been completed, the amount indicated and registered, and the till closed. The keys by which the registration and indication were effected will be locked in by the bars K and the till-cover will be locked by one or both of the bars D. If now a new transaction occurs, the cashier operates the finger-piece $l^5$, which lifts the bail L and unlocks the keys and registering devices, so that they return to their normal positions. The keys in returning release the shafts M, which are turned forward by springs, so that their arms $m^2$ pass under the studs $d^3$ and lift the bars D, thereby unlocking the till-cover. The cover is now pushed open by hand and is caught and held open by the bail engaging its teeth. After the proper deposit has been made in the till the proper keys are operated to register the amount, the effect of which is to raise the bail out of engagement with the top of the cover, which is instantly closed by the spring and locked by the bars D, leaving the indication still exposed and the keys locked. As the keys are pressed inward the shafts M are turned backward by the key-studs $e$, thereby releasing the bars D, which fall by gravity behind the till-cover as soon as the latter has advanced beyond them.

Passing now to the consideration of the phonographic attachment, O represents a phonographic reproducer consisting of a small hollow body $o$, connected by a flexible tube $o^5$ to the trumpet $o^6$ and closed on one side by a diaphragm $o'$, bearing a pointer or style $o^2$, arranged to ride upon and receive motion from the indented record-surface of the segment P, the general construction and mode of operation being essentially the same as in the familiar Edison and Tainter instruments now in general use. The reproducer is sustained from a horizontal guide-rod $o^3$ and is attached to a cord $o^4$, passing thence to the right and left around fixed guide-pulleys $o^5$ and around pulleys $o^6$ on the till-cover, and finally attached at its ends to the frame, so that as the till-cover is opened and closed the reproducer is moved to the right and left lengthwise of the record-surface.

The record, which is prepared before its introduction into the machine, consists of parallel lines adapted, respectively, to announce the amounts represented by various keys. It is fixed or formed on the surface of a segmental body P, turning on a horizontal pivot $p$, so that one or another of the record-lines may be brought into operative relation to the style. The segment has at each end an arm $p'$, connected by link $p^2$ to the adjacent vertical shaft $f^8$. Now as each key turns this shaft a distinctive distance it follows that the segment is at the same time turned to the proper position for the diaphragm to announce the amount represented by the key. During the return movement of the recorder, it is necessary that it shall be held out of contact with the record-surface. To this end the parts are adjusted so that the vertical shafts turn the record-segment P upward beyond the path of the style during the return movement of the recorder.

In order to control the distance between the recorder and the record-surface I provide the recorder-arm with a roller $o^7$, arranged to ride against the edge of the fixed horizontal bar $o^8$, as shown in Fig. 9. The roller is adjusted on the arm by a screw $o^{10}$, in order to move the recorder to or from the record-surface.

As the registration will frequently be confined to cents—that is, to an amount less than a dollar—it is necessary to bring into operation that portion only of the record which announces cents. The record-bearing segment is therefore divided, as shown in Fig. 13, transversely into three sections, that on the left representing cents, that on the right dollars, and the intermediate section bearing repetitions of the word "and." The left-hand section representing cents is at all times free to turn forward—that is to say, downward—independently of the other sections under the influence of the cent-keys if the dollar-keys are not operated. An elbow-lever $p^4$ is pivoted to the central section with one end in position to be operated by a cam groove $p^5$ in the end of the dollar-section, as seen in Fig. 12, and the other end in position to engage the cent-section, so that when the latter is operated it will carry forward with it the intermediate sections in order that the word "and" may be announced between the announcement of the dollars and cents.

In order that the style may not ride into and be injured by the joints between the sections the guide-bar $o^8$ has slight elevations on the face, as shown at $o^{11}$ in Fig. 3, to lift the recorder away from the surface of the record as the style passes the joints.

It will be understood that the right and left ends of the record-segment are turned, respectively, by the dollar and the cent keys and that their movements are independent, so that either of the dollar-records may be read in connection with either of the cent-records and with the intermediate conjunction.

The operation of the phonographic apparatus is as follows: The recorder stands normally at one side of the apparatus and out of contact with the record. When finger-keys are pressed to effect the registration, they turn the sections of the record-bearing segment to the appropriate positions in the path of the style, and when the till-cover is opened it carries the recorder from one side of the apparatus to the other, causing the style to traverse the record-groove in each of the sections, so that the diaphragm acts to announce audibly from the trumpet the amounts registered.

While I have represented the preferred construction and arrangement of the articulating devices, it is to be distinctly understood that these details are not of the essence of my invention, but that the record-surface, the reproducing mechanism, and the connection between these parts and the registering mechanism may be modified in various ways which will suggest themselves to the skilled mechanic.

I believe myself to be the first to combine with a register a mechanism which will announce or call out the amounts registered, and this combination I claim in any form and manner adapted to give results the substantial equivalent of that herein described. It is manifest that this combination is not limited to the particular registering mechanism herein shown.

I do not claim herein, either alone or in combination, the finger-keys, shafts F, the registering-drums $f$, the stop-pins J, the key-locking plates K, or the bail to lock the till-cover, as these parts are the subject-matter of my application filed June 26, 1890, Serial No. 356,825.

Referring again to Figs. 6 and 11, when the band H for indicating large amounts has been wound off the drum $h$ onto the drum $h'$, it may be again wound on the drum $h$ by means of a bevel-gear $t$, which engages a bevel-gear $t'$, fixed to the drum $h$. The gear $t$ is carried and turned by a shaft $t^2$, which is extended outward through the casing and provided on its outer end with a milled head $t^3$, Fig. 6. During the return movement of the band, which will be required only at very long intervals, the band may be pressed and held laterally out of engagement with the escapement by the hand of the attendant, the casing being at such time removed.

In order to prevent the till-cover from closing too rapidly under the influence of its closing-spring and to retard the action of the connected parts, including the phonographic mechanism, I employ, preferably, a pneumatic retarding device, such as represented in Fig. 15. This pneumatic device consists of a cylinder S, fixed to the under side of the base-plate of the casing A. The cylinder is open at its front and receives a piston $s$, carried by a rod $s'$, attached at its forward end to the cover C. At its rear end the cylinder is provided with a hinged valve $s^2$, containing a small opening for the limited admission of air to the cylinder. When the cover is opened by pushing it rearward, the valve $s^2$ opens and permits the piston to move readily within the cylinder. When, however, the cover is closed by its spring, the valve closes and the limited amount of air entering the opening in the valve allows the piston to move but slowly.

It is to be understood that retarding or governing devices of other forms may be employed; but I prefer to use the pneumatic device described.

Having thus described my invention, what I claim is—

1. In a cash-register, the combination of mechanism for registering different values at the will of the operator and a phonograph so controlled thereby that on the operation of the register to register any particular sum the phonograph will announce such amount.

2. A cash-register having a registering mechanism with a series of finger-keys representing different values, in combination with a phonograph having permanent records of the values represented by the keys, and intermediate connections through which the respective keys act to bring into action the corresponding record that the phonograph may announce audibly the registration.

3. In combination with a cash-register, a phonograph containing a record of amounts to be registered and arranged to be adjusted by the registering mechanism, a till-cover, and connections through which it actuates the phonograph.

4. In combination with a registering mechanism, a phonographic record of the various values to be registered, means for automatically adjusting the position of the record according to the value of the keys operated, and a reproducer movable over the record to announce therefrom the amount of the registration.

5. A phonographic-record surface having thereon in parallel lines independent records, in combination with a reproducer guided to travel lengthwise of the record, and means for a lateral adjustment of the reproducer in relation to the record to the end that either of the records may be reproduced at will.

6. In combination with the reciprocating reproducer, the phonographic-record sections provided, respectively, with the dollar-records the cent-records, and the conjunction "and" and movable in relation to each other.

7. In combination with the three oscillating record-sections, the connecting device operated by one of the sections, substantially as shown.

8. In combination with the reciprocating recorder, the elongated record over which it travels and automatic means for separating the recorder and record during the movement of the latter in one direction.

9. In combination with the recorder and means for guiding the same to and fro, record-body pivoted and adapted to be turned out of the path of the recorder during the return movement of the latter.

10. In combination with the finger-keys and the vertical rock-shaft F operated thereby, the segment having the series of parallel records and connections through which the shaft F adjusts the record, and the recorder mounted to travel over the record.

11. In combination with the traveling reproducer and the divided record-surface, the guide-rail having the elevators to lift the reproducer over the joints in the record.

12. A phonographic-record surface having independent parallel records, in combination with a reproducer and means for adjusting the parts at will to reproduce a selected record.

13. In combination with a reproducer, a phonographic record consisting of sections adjustable in relation to each other, so that they may be used independently or jointly.

14. In combination with a reproducer to operate thereon, a phonographic record consisting of a plurality of sections movable in relation to each other and each provided with a series of independent records, so that any record of one section may be reproduced combination with either record of the adjacent section.

In testimony whereof I hereunto set my hand, this 4th day of August, 1890, in the presence of two attesting witnesses.

AUSTIN B. HAYDEN.

Witnesses:
 E. C. SATTLEY,
 GEO. H. CHURCHILL.